(12) United States Patent
Schlack

(10) Patent No.: US 8,196,165 B2
(45) Date of Patent: Jun. 5, 2012

(54) METHOD AND APPARATUS FOR DELIVERING EMERGENCY ALERT SYSTEM (EAS) MESSAGES OVER A SWITCHED DIGITAL VIDEO (SDV) SYSTEM

(75) Inventor: John Schlack, Quakertown, PA (US)

(73) Assignee: General Instrument Corporation, Horsham, PA (US)

( * ) Notice: Subject to any disclaimer, the term of this patent is extended or adjusted under 35 U.S.C. 154(b) by 882 days.

(21) Appl. No.: 12/110,422

(22) Filed: Apr. 28, 2008

(65) Prior Publication Data

US 2009/0271818 A1    Oct. 29, 2009

(51) Int. Cl.
- H04N 7/16 (2011.01)
- H04N 7/10 (2006.01)
- H04N 7/025 (2006.01)
- H04N 7/18 (2006.01)
- H04N 7/173 (2011.01)

(52) U.S. Cl. ....................................................... 725/33
(58) Field of Classification Search ...................... 725/32
See application file for complete search history.

(56) References Cited

U.S. PATENT DOCUMENTS

| 5,630,757 | A  | * | 5/1997  | Gagin et al. ................... 463/43 |
| 2003/0204853 | A1 | * | 10/2003 | Fries et al. .................... 725/93 |
| 2004/0250283 | A1 | * | 12/2004 | Duigenan et al. .............. 725/60 |
| 2006/0095945 | A1 | * | 5/2006  | Carpenter et al. ............. 725/87 |
| 2007/0136304 | A1 |   | 6/2007  | Stone et al. |
| 2007/0136743 | A1 | * | 6/2007  | Hasek et al. ................... 725/33 |
| 2009/0025027 | A1 | * | 1/2009  | Craner ............................ 725/32 |

* cited by examiner

*Primary Examiner* — Justin Shepard (57) ABSTRACT

A switched digital video (SDV) system includes an SDV manager for coordinating SDV sessions requested by subscriber terminals associated with at least one service group. The SDV system also includes an input for receiving content to be delivered during the SDV sessions and at least one edge device for receiving transport streams that include an SDV program provided by the input and for transmitting each transport stream over an access network to at least one of the subscriber terminals on one of a plurality of SDV channels. In response to receipt of a message from a subscriber terminal in a first service group indicating that an EAS event is occurring, the SDV manager is configured to suspend reclamation of network resources allocated to the first service group which otherwise occurs when subscriber terminals tune off an SDV channel.

22 Claims, 4 Drawing Sheets

METHOD AND APPARATUS FOR DELIVERING EMERGENCY ALERT SYSTEM (EAS) MESSAGES OVER A SWITCHED DIGITAL VIDEO (SDV) SYSTEM

FIELD OF THE INVENTION

The present invention relates generally to a switched digital video system for distributing content to a subscriber over a system such as a satellite or cable television system, and more particularly to a switched digital video system that delivers Emergency Alert System (EAS) messages.

BACKGROUND OF THE INVENTION

As is well known, the Emergency Alert System (EAS) is designed to allow for the rapid and widespread dissemination of information relating to a national or local emergency to the general public. EAS messages are transmitted for either national, state or local emergencies or other events. Examples of these emergencies or events include: severe weather watch/storm warning, flash floods, earthquakes/tsunami, and war or other "man made" emergencies.

The EAS was designed in part by the Federal Communications Commission (FCC) in cooperation with the National Weather Service (NWS) and the Federal Emergency Management Agency (FEMA), in order to support the roles of each organization. The FCC provides information to broadcasters, cable system operators, and other participants in the EAS regarding the technical and operational requirements of the EAS. Additionally, the FCC ensures that state and local EAS plans conform to FCC rules and regulations. The NWS provides emergency weather information to alert the public about dangerous or potentially conditions weather conditions or other natural events. FEMA provides direction for state and local emergency planning officials to plan and implement their roles in the EAS.

Since Dec. 31, 1998, cable systems that have 10,000 or more subscribers are part of the EAS. These cable systems have the capability to transmit emergency messages on all of their video channels.

Alerts sent via the EAS may arrive in the form of text, audio and/or video content. Depending on the message type, the subscriber's television or set-top box or terminal will display the message in the appropriate format and according to the prescribed method. State and Local area emergency messages may be transmitted by using EAS Header and End of Message Codes. In television environments, the FCC recommends that the codes be preceded by an announcement that informs listeners that an EAS transmission will occur.

Recently, network operators have begun to offer switched digital video (SDV) services over cable and other broadcast networks. Switched digital video (SDV) refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, a switched digital video channel is only available when requested by one or more authorized subscribers. Also, unlike video on-demand, which switches a singlecast interactive program to a user, switched digital video switches broadcast streams, making each stream available to one or more subscribers who simply join the broadcast stream just as they would with normal broadcast services. That is, once a switched service is streamed to a subscriber, subsequent subscribers associated with the same service group as the first subscriber can tune to the same broadcast stream. The switched digital video will often share the same resource managers and underlying resources with other on demand services.

One way to support switched digital video is to utilize the session manager to manage SDV and other sessions. For each channel change, the subscriber will set up a broadcast session with the session manager, which will determine if the requested channel is already being sent to the corresponding service group that the subscriber belongs to. The subscriber will be assigned to join the existing SDV session if the requested channel is available at the service group or assigned to a new SDV session if the requested channel is not available at the service group. The session manager will negotiate with the edge devices to allocate resources required for the session. The edge device (e.g., a digital modulator such as a QAM modulator) needs to dynamically retrieve the MPEG single program transport stream that carries the requested SDV program (likely via IP multicast) and generate the MPEG multiple program transport stream. As part of the session setup response message, the video tuning parameters such as frequency and MPEG program number are sent back to the subscriber to access the requested SDV channel.

Communication between the session manager and the subscriber is performed using an SDV Channel Change Message (CCM) protocol, which can be implemented as a proprietary protocol or using an open standard. Among other things, these protocols pass channel change message or request from the subscriber to the session manager. The session manager responds by sending a message that includes the necessary tuning information to the subscriber.

When an EAS message is sent to a set of subscribers, the subscribers are directed to tune to a specific frequency and program number to view the EAS message. As a result each subscriber sends a channel change message to the session manager. This may cause such a large number of subscribers to send channel change messages at the same time that the bandwidth of the network will not be able to support all the messages. A small number of the channel change messages will get through, but the rest likely will be lost. If the network includes a retry mechanism, the failed messages will be resent after a short random backoff period. This will cause still more network congestion due to the additional channel change messages being generated.

The occurrence of an EAS condition or event may give rise to other problems in addition to the generation of an excessively large number of channel change messages. For example, it may be difficult for the subscribers to re-tune to their previous SDV channels after the EAS condition has ended. In part this problem arises because network congestion may prevent the subscriber from communicating with the session manager, which will be unable to process the channel change requests to re-tune to the previous SDV channels.

SUMMARY OF THE INVENTION

In accordance with the present invention, a switched digital video (SDV) system is provided. The SDV system includes an SDV manager for coordinating SDV sessions requested by subscriber terminals associated with at least one service group. The SDV system also includes an input for receiving content to be delivered during the SDV sessions and at least one edge device for receiving transport streams that include an SDV program provided by the input and for transmitting each transport stream over an access network to at least one of the subscriber terminals on one of a plurality of SDV channels. In response to receipt of a message from a subscriber terminal in a first service group indicating that an EAS event is occurring, the SDV manager is configured to suspend reclamation of network resources allocated to the first service group which otherwise occurs when subscriber terminals tune off an SDV channel.

In accordance with another aspect of the invention, a method is provided for managing network resources when an EAS event occurs while a subscriber terminal is receiving a program on an SDV channel. The method includes receiving a channel change message over an access network from a subscriber terminal in a first service group indicating that the subscriber terminal is tuning from an SDV channel to a channel on which an EAS message will be received. In response to receipt of the channel change message, reclamation of network resources allocated to the first service group is suspended.

In accordance with another aspect of the invention, a method is provided for communicating over an access network when receiving an EAS message. The method includes receiving a message over the access network requesting a subscriber terminal in a first service group to tune to a channel on which an EAS message will be received. The message is received during receipt of an SDV program over a first downstream SDV channel on an access network. A second message is received over the access network indicating that an upstream network node has not been notified that an EAS event is occurring. In addition, a channel change message is transmitted over an upstream path in the access network indicating that the subscriber terminal is tuning from the first downstream SDV channel to the channel on which the EAS message will be received.

DETAILED DESCRIPTION

The number of Channel Change Messages that need to be sent from a subscriber to the SDV manager or other appropriate entity is reduced when an EAS event occurs in accordance with the techniques, methods and systems described below.

Figure 1:
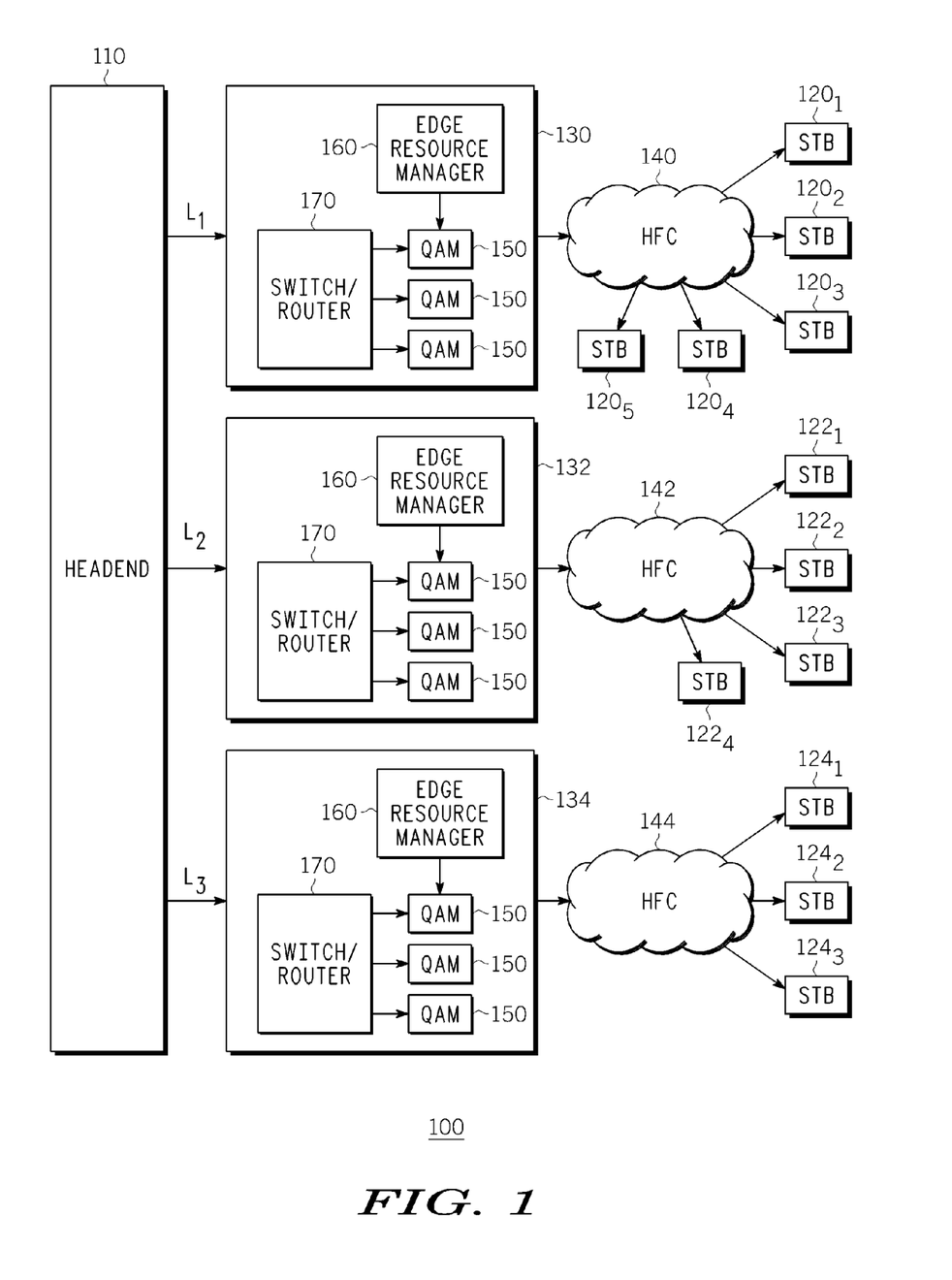
FIG. 1 shows one example of a system architecture for delivering switched digital video content to a subscriber.

FIG. 1 is a system architecture 100 for delivering switched digital channels to a subscriber during a switched digital video (SDV) session. The SDV session is implemented through a service offering in which application level data generated by a set-top terminal initiates a SDV session request and an SDV manager routes data in accordance with the request to provision the service. Among other components, system architecture 100 comprises a content source such as a headend 110 that is connected to multiple intermediate entities such as hubs 130, 132 and 134. The headend 110 communicates with a switch or router 170 in hubs 130, 132 and 134 over links L1, L2 and L3, respectively. The headend 110 and hubs 130, 132, and 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicates with end user equipment as illustrated. In particular hubs 130, 132 and 134 in FIG. 1 communicate with access networks 140, 142 and 144, respectively. Each access network 140, 142 and 144 in turn communicates with multiple end user devices such as set top or subscriber terminals. In the example of FIG. 1, access network 140 communicates with set top terminals $120_1$, $120_2$, $120_3$, $120_4$ and $120_5$, access network 142 communicates with set top terminals $122_1$, $122_2$, $122_3$ and $124_4$, and access network 144 communicates with set top terminals $124_1$, $124_2$ and $124_3$.

In addition to the switch or router 170, each hub can include an array of radio frequency transmitter edge devices such as edge QAM modulators 150. The number of edge devices 150 in each hub may vary as needs dictate. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

Each hub 130, 132 and 134 also includes an edge resource manager 160 for allocating and managing the resources of the edge devices 150. The edge resource manager 160 communicates with and receives instructions from the session manager located in the headend 110. In some case the edge resource manager and/or session manager can be located in the headend.

When a viewer selects an SDV channel using a subscriber terminal such as a set top terminal, the SDV system actively switches the channel onto one of the QAMs that serves that particular set top terminal. The set top terminals are generally arranged into service groups and each of the service groups is assigned to, and serviced by, one or more QAM modulators. For example, in the arrangement depicted in FIG. 1 set top terminals $120_1$, $120_2$, $120_3$, $120_4$ and $120_5$ are assigned to QAM modulators 150 located at hub 130, set top terminals $122_1$, $122_2$, $122_3$ and $122_4$ are assigned to QAM modulators 150 located at hub 132, and set top terminals $124_1$, $124_2$ and $124_3$ are assigned to QAM modulators 150 located at hub 134. Typically, four (4) or eight (8) QAM modulators are deployed per service group to carry the SDV channels. SDV service groups currently include from about 500 to 1000 set top terminals. Depending on the system topology, there may or may not be a one-to-one correspondence between the hubs and the service groups. For instance, it is typically the case that each hub serves multiple service groups.

Figure 2:
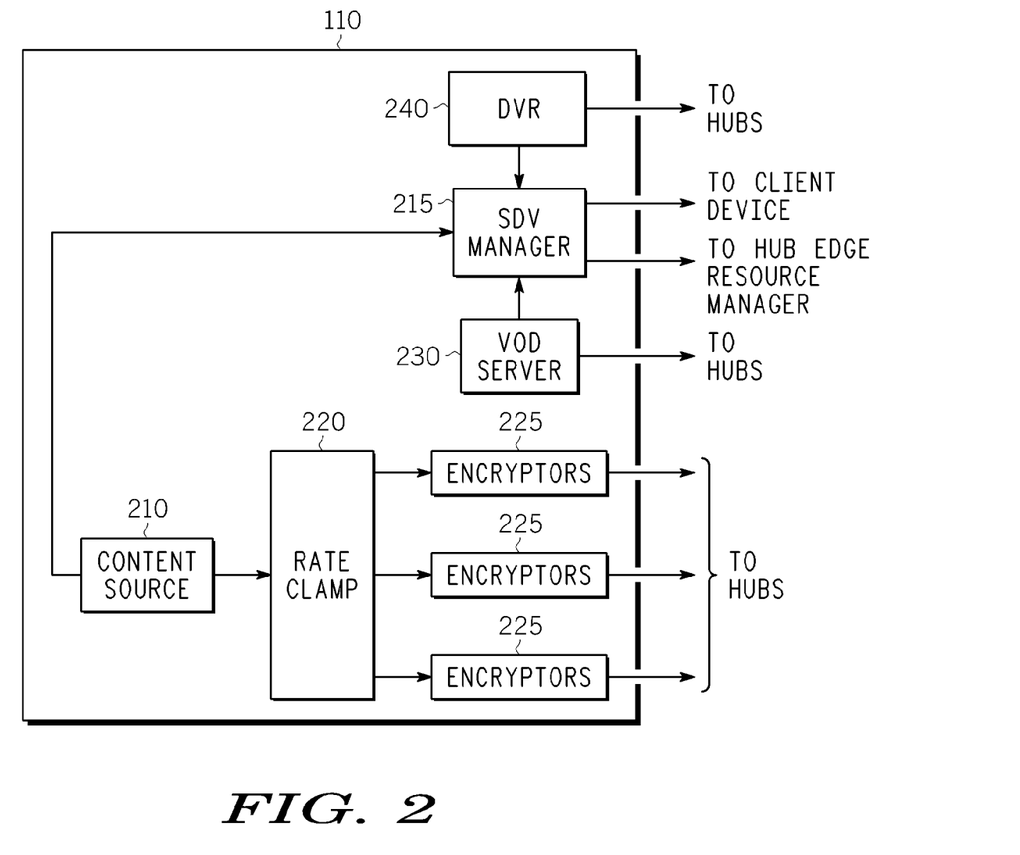
FIG. 2 shows one example of the headend depicted in FIG. 1.

FIG. 2 shows one example of headend 110. The headend 110 includes a broadcast content source 210, which may include, by way of example, satellite receivers, off-air receivers and/or content storage devices such as servers. A SDV manager 215 is used to determine which SDV transport streams are being transmitted at any time and for directing the set top terminals to the appropriate stream. The SDV manager 215 also keeps track of which subscribers are watching which channels and it communicates with the edge resource managers 160 in the hubs so that the content can be switched on and off under the control of the SDV manager 215. In addition, all subscriber requests for a switched digital channel go through the SDV manager 215. The switched digital channels are forwarded to a rate clamp 220 and one or more encryptors 225 using, for example, IP multicast addressing. The content is then encrypted by the encryptors 225 and transmitted to the appropriate hub or hubs. Typically, standard definition (SD) channels are currently rate clamped to 3.75 Mbps while high definition channels are currently rate clamped to between about 12 Mbps and 15 Mbps. The encryptors 225 encrypt the digitally encoded content, often under the control of a conditional access system (not shown).

Headend 110 may also include a network DVR 240. The network DVR 240 stores content that can be transmitted to set top terminal via a hub and access network in response to a user request to play a program stored on the DVR 240. Other user input requests are also serviced by network DVR 240, including, for example, requests to accelerate the playing of a program in the forward direction (e.g., cueing) and in the reverse direction (e.g., reviewing). The content is stored by the network DVR 240 upon a user request. The content may be provided to the network DVR 240 from any available content source, including, for example, content source 210.

It should be noted that in some cases the functionality of some or all of the SDV manager 215 may be transferred to each of the hubs 130,132 and 134. For example, as described below, channel change messages may be communicated between the set top terminals and the hubs.

Headend 110 may also include a variety of other components for offering additional services. For example, in FIG. 2 a video on demand (VOD) server 230 is shown for storing programs or other content for distribution to subscribers on an on-demand basis. Although not shown, one of ordinary skill in the art would recognize that other components and arrangements for achieving the various functionalities of headend 110 are possible. For example, the head-end 110 may comprise typical head-end components and services including a billing module, an advertising insertion module, a subscriber management system (SMS), a conditional access system and a LAN(s) for placing the various components in data communication with one another. It will also be appreciated that the headend configuration depicted in FIG. 2 is a high-level, conceptual architecture and that each network may have multiple head-ends deployed using different architectures.

The edge devices 150 provide programming to the set top terminals using the downstream in-band channels. To communicate control information and the like with the headend 110 and/or the relevant hub, the set top terminals may use out-of-band (OOB) or DOCSIS channels or an IP tunnel or an IP connection and associated protocols. However, in some cases communication of control information and the like can be performed using in-band channels as well.

Control information that may be communicated over the out-of-band channels includes the aforementioned SDV Channel Change Messages (CCM), which are used to pass channel change requests from the subscriber to the SDV manager 215 in the headend 110. In particular, the SDV manager 215 receives channel change requests for switched digital content from a set top terminal to bind that content to a session on one of edge devices 150 serving that set top terminal's service group. The channel change request message is generated by the SDV application (or its designated proxy) resident in the set top terminal in response to the subscriber's program channel request that is entered by the set top terminal's user interface. The SDV manager 215 responds to the set top terminal with the frequency and program number where that content may be found. The SDV manager 215 also receives channel change request messages for non-SDV (e.g., broadcast) channels in order to gather statistics that can be used to better understand subscriber activity and to provide information that can be used for targeted advertising and the like. Another reason to receive non-SDV channel changes is so that the SDV Manager knows when the set top terminals are no longer tuned to an SDV channel, thus allowing the SDV Manager to remove the SDV channel from the network to save bandwidth.

As previously mentioned, when an EAS message is transmitted, the set top terminal is directed to tune to a specific frequency and program number to view the EAS message. That is, the set top terminal enters an EAS state. As a result each set top terminal sends an upstream message (i.e., a channel change message) to the SDV manager 215. Since a large number of subscribers may be sending channel change messages at the same time, the available upstream bandwidth of the network may not be able to support all the messages. As the channel change messages are received, however, the SDV manager may reallocate the bandwidth that has been released by the set top terminals as they enter the EAS state by switching to the channel on which the EAS message is to be viewed. As result it may be difficult for the set top terminals to re-tune to their previous or original SDV channels after the EAS condition has ended, both because the network resources may no longer be available since they may have been reallocated and also because upstream network congestion may prevent the SDV manager from receiving the channel change messages sent by the set top terminals when they attempt to re-tune to their original SDV programming.

The aforementioned problems arising when an SDV system processes an EAS event can be alleviated with one or more of the features and techniques that are described herein.

When the SDV manager receives the first channel change message from a set top terminal in a particular service group indicating that an EAS condition has arisen, the SDV manager may assume that all the set top terminals in that service group will be entering the EAS state. In response the SDV manager suspends all bandwidth reclamation activities for that service group. In other words, as the set top terminals in the service group enter the EAS state by tuning away from the respective SDV channels they are currently receiving, the bandwidth and other resources associated with that SDV channel will not be reallocated by the SDV manager.

In addition to suspending bandwidth reclamation activities, the SDV manager may also lock in place for the duration of the EAS event all the SDV channels currently being delivered. In this way the frequency and program number associated with each SDV program that was being delivered immediately prior to the EAS event will be the same immediately after the EAS event. After the end of the EAS event, the set top terminal can simply re-tune to the frequency and program number of the original SDV program they were receiving before the EAS event. The information needed for the re-tune may be available within the set top terminal itself, where it may have been stored in a memory or buffer, or alternatively, the information may be made available from the SDV manager through a broadcast mechanism.

If a broadcast mechanism is employed to send the re-tune information that the set top terminals need to return to their original SDV programming after the EAS event, a broadcast message can be sent to all the set top terminals in the affected service group(s) specifying the tuning information for all the SDV programming that was being delivered when the SDV channels were locked. This broadcast message may be similar to the active services list that is repeatedly sent from the SDV manager to the set top terminals, which contains a list of all the active services currently being streaming to each service group along with the tuning parameters required to access them. This repeating information is typically transmitted either in-band or out-of-band using a protocol such as the mini-carousel protocol (MCP). For example, in the case of the mini-carousel protocol, the MCP message sent to the set top terminals includes one entry for each active service (e.g., each SDV program).

An illustrative format for an entry in the active services list is as follows: (i) Bytes 0-3: Broadcast Program ID; (ii) Byte 4: Modulation Index (6=QAM-16, 7=QAM-32, 8=QAM-64, 12=QAM-128, 16=QAM-256); (iii) Bytes 5-7: Carrier Center Frequency/100; (iv) Bytes 8-9: MPEG Program Number; (v) TTL—Bytes 10-11 indicating the number of seconds for which the entry is valid. Of course, other protocols may be used instead of the MCP described above. In any case, the broadcast message used when an EAS event occurs may be similar to this format for the active services list. One piece of information that is available in the entry for each service is the Time-To-Live (TTL), which specifies the expected remaining duration of an active service. In the case of the broadcast message that includes the tuning information for the SDV channels that were locked during an EAS event, the TTL should specify that a particular SDV channel will be available for a duration longer than the expected duration of the EAS message, plus some additional time to allow the set top terminals to recover from the event. For instance, by way of example, the TTL may be set for 5 minutes. When the EAS event ends and the set top terminals are ready to tune back to their original SDV channels, the set top terminals simply look to the tuning information in the broadcast message. If the EAS event ends before the TTL terminates (as indicated by the SDV manager's receipt of a channel change request from a terminal in the affected service group), the SDV channels can be unlocked at this time, followed by the resumption of resource reclamation activities, despite the fact that the TTL has not terminated. On the other hand, if the EAS event extends beyond the TTL, the SDV channels may remain locked until the SDV manager receives a channel change request.

By broadcasting the information needed by the set top terminals after the EAS event, the set top terminals will be able to tune back to their original channels after the EAS event even if the network is congested due to an excessive number of channel change messages being transmitted.

The mechanism described above to allow set top terminals to tune back to their original SDV channels after the occurrence of an EAS event does not resolve the upstream network congestion problem, which occurs when the affected set top terminals send channel change messages to the SDV manager at the end of the EAS event. One way to address this problem is to have the set top terminals wait a randomly selected amount of time before sending the channel change message upon re-tuning to their original channels. For instance, the set top terminals may be instructed to randomly select a time from within a predefined backoff period, which may range, for instance, from a few seconds to a few minutes. For instance, in one example, if the available upstream network bandwidth can support receipt of 40 to 50 channel change messages per second at the SDV manager and a service group has about 500 set top terminals, a backoff period of about 15 to 20 seconds should be adequate. A similar backoff period may be used when the set top terminals send a channel change message upon entering the EAS state.

In some cases the set top terminals may not automatically tune back to their original channel. In this case the viewer must manually re-tune to the programming that was interrupted by the EAS event. The period of time before the manual re-tune may effectively serve as a random backoff period.

Other techniques may be employed to alleviate the upstream network congestion problem. For instance, if the set top terminals will automatically tune back to their original SDV channels after the EAS event, the set top terminals may be programmed to suppress the creation and transmission of a channel change message. In this case only if the set top terminal will be tuning to a different channel after the EAS event will a channel change message be generated.

In other cases the broadcast message that includes the tuning information used by the set top terminals after the EAS event may include an EAS flag or other indicator. The flag may be set when the SDV manager is first notified by one of the set top terminals in the affected service group(s) that an EAS event is occurring. The flag will continue to be set in the subsequent broadcast messages that are periodically sent to the set top terminals on an ongoing basis using, for instance, a mini-carousel protocol. Accordingly, if a random backoff period is employed when the set top terminals send a channel change message upon entering the EAS state, the flag will inform the remaining set top terminals that they do not need to send channel change messages informing the SDV manager that they will be entering the EAS state. Likewise, the EAS flag will be cleared when the SDV manager first receives a channel change message from a set top terminal indicating that the terminal is exiting the EAS state. When the remaining set top terminals receive subsequent broadcast messages with the cleared EAS flag, they will know that they do not need to send channel change messages informing the SDV manner that they are returning to their original programming.

Figure 3:
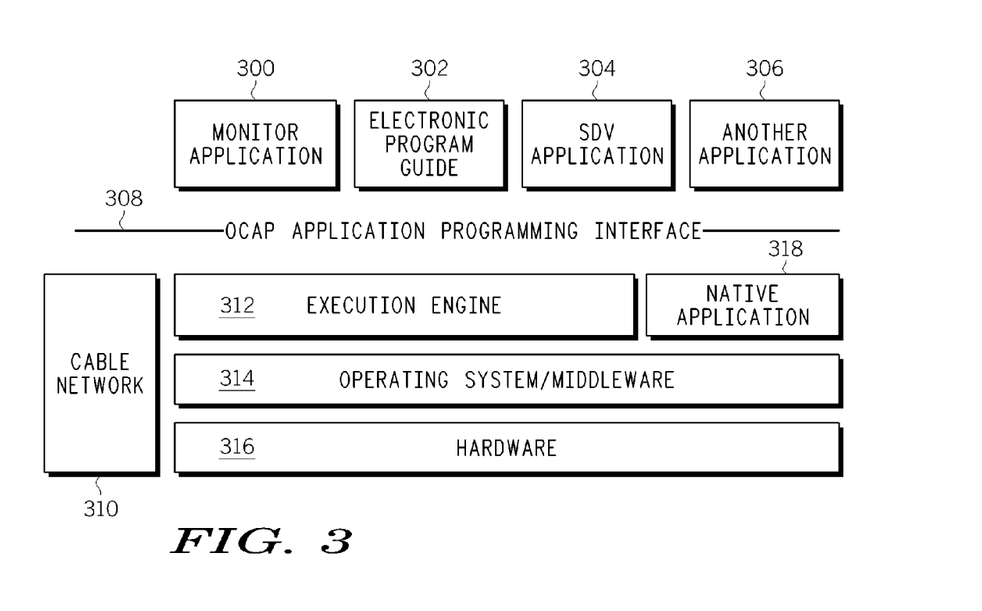
FIG. 3 shows the logical architecture of one particular example of a set top terminal.

FIG. 3 shows the logical architecture of one particular example of a set top terminal. In this example the set-top terminal is compliant with the OpenCable Application Platform (OCAP) hardware and software environment. The OCAP specification is a middleware software layer specification intended to enable the developers of interactive television services and applications to design such products so that they will run successfully on any cable television system, independent of set-top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the set top terminal is not limited to an OCAP-compliant software/hardware architecture. In other cases, for example, the client devices 106 may be compliant with MHEG, DASE or Multimedia Home Platform (MHP) middleware. Alternatively, the set top terminal may be based on a proprietary architecture.

Referring to FIG. 3, the top of an OCAP software "stack" includes a Monitor Application 300, Electronic Program Guide (EPG) 302, SDV 304, and any other applications 306 that may be deployed in a particular network. These applications are run on top of a software layer called the "Execution Engine" 312 and interface to the Execution Engine using the well known OCAP APIs 308. The client device may also include certain software applications or "Native Applications" 318 that do not run within the Execution Engine, but directly run on top of the Operating System/Middleware 314 for the client device. Native Applications are typically written for, e.g., a particular hardware configuration 316 of the client device 106. Examples of such Native Applications may include management of front panel functionality, remote control interaction, games, and the like.

Figure 4:
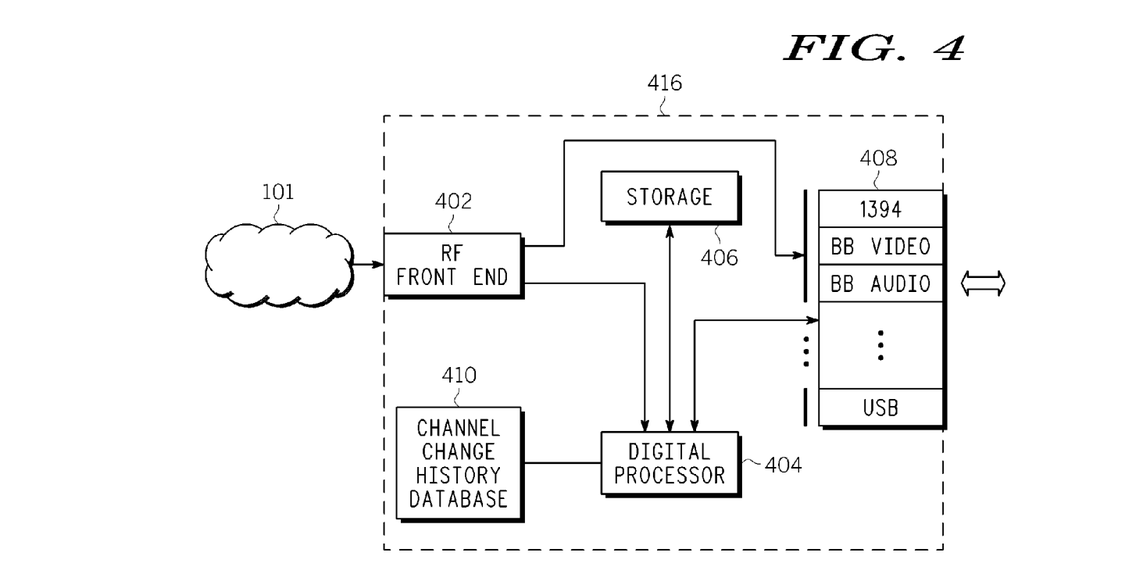
FIG. 4 shows one example of the hardware employed in the set top terminal of FIG. 3.

FIG. 4 shows one example of the set top terminal hardware 416. The device hardware 416 generally includes an RF front end 402 (including a modulator/demodulator and a tuner or tuners) for interfacing with the distribution network (e.g., HFC network 140) of FIG. 1, digital processor(s) 404, storage device 406, and a plurality of interfaces 408 (e.g., video/audio interfaces, IEEE-1394 "Firewire", USB, serial/parallel ports, etc.) for establishing communication with other end-user devices such as televisions, personal electronics, computers, WiFi or other network hubs/routers, etc. Other components which may be utilized within the device include one or more decoder stages, various processing layers (e.g., DOCSIS MAC, OOB channels, MPEG, etc.) as well as media processors and other specialized SoC or ASIC devices. These additional components and functionality are well known to those of ordinary skill in the art and accordingly are not described further herein.

The SDV application 304 is responsible for communicating SDV control messages (e.g., the channel change messages) between the set top terminal and the SDV manager. The SDV application 304 also receives the aforementioned broadcast messages that contain the tuning information need to re-tune back to the original SDV program that the subscriber was viewing prior to the EAS event.

Figure 5:
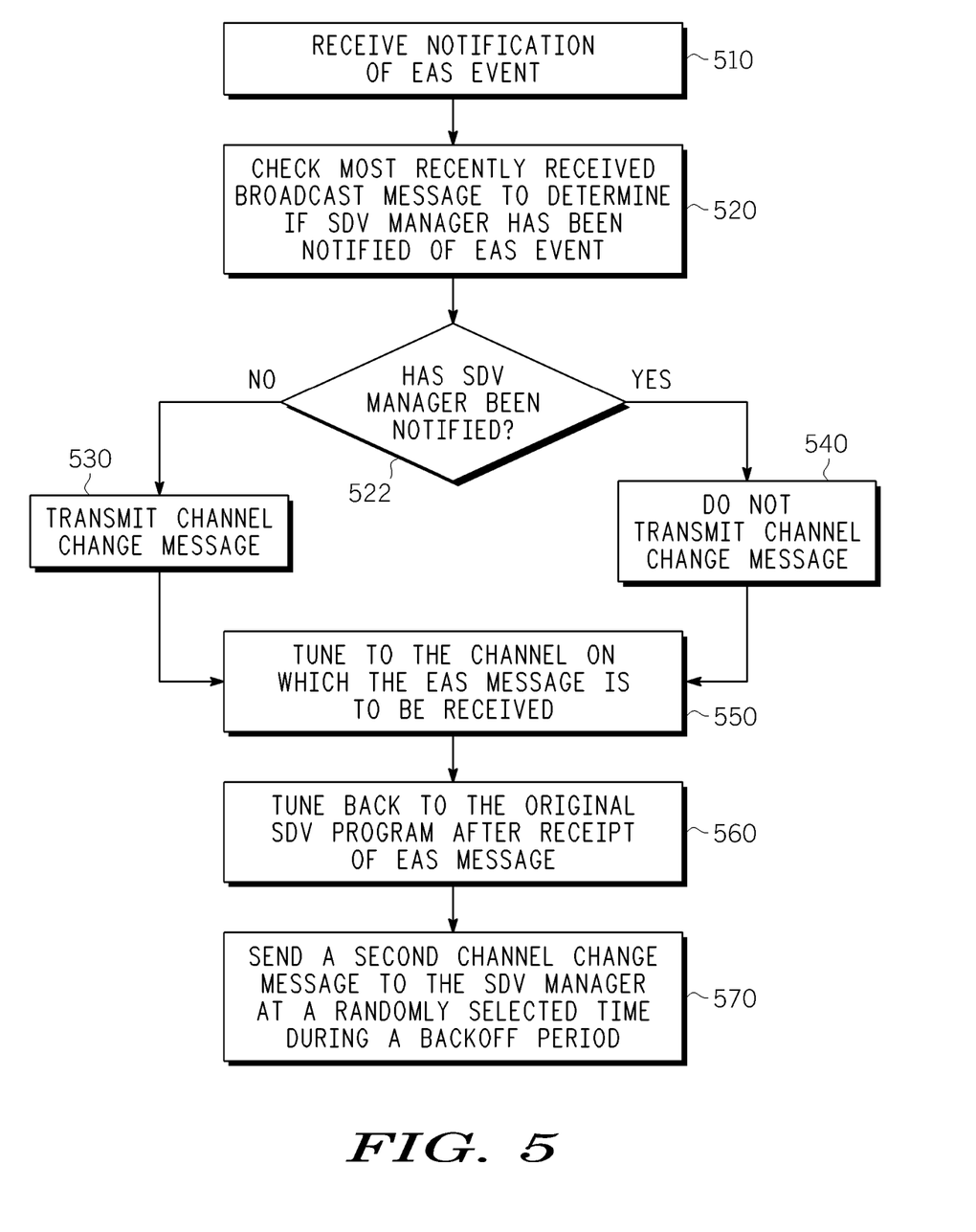
FIG. 5 shows one example of a method by which a subscriber viewing a program on an SDV channel is tuned to an EAS message and then automatically tuned back to the original program he or she was watching.

FIG. 5 shows one example of a method by which a subscriber viewing a program on an SDV channel is tuned to an EAS message and then automatically tuned back to the original program he or she was watching. The method begins in step 510 when, during receipt of an EAS program, a set top terminal or other subscriber terminal receives a message over the access network requesting the subscriber to tune to a channel on which an EAS message will be presented. In response, in step 520, the subscriber terminal checks the most recent broadcast message it has received from the SDV manager in the headend or other upstream node to determine if the headend or node has been notified (by, for instance, another subscriber terminal in the same service group) that an EAS event is occurring. If the SDV manager has not been notified, the subscriber terminal transmits a channel change message in step 530. The channel change message indicates that it is tuning from the SDV program to the channel on which the EAS message will be presented, which may be a broadcast channel or an SDV channel. If the SDV manager has been notified, then in step 540 the subscriber terminal will refrain from sending the channel change message. In step 550 the subscriber terminal tunes to the channel on which the EAS message is to be received. At the end of the EAS message, the subscriber terminal tunes back to the original SDV program (step 560) and sends a second channel change message to the SDV manager (step 570). The second channel change message is sent at a randomly selected time during a backoff period. In this way the upstream network congestion problem is reduced because the multiple subscriber terminals that are all sending channel change messages as they tune back to their original SDV programming will not all be sending the messages simultaneously. Rather, the messages will be distributed over the backoff period.

The processes described above, including but not limited to those presented in connection with FIG. 5, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for delivering emergency alert system messages over a switched digital video system without generating an excessive number of channel change messages. This is accomplished by suspending all bandwidth reclamation activities for the affected service group and by locking in place for the duration of the EAS event all the SDV channels currently being delivered. In this way, after the end of the EAS event, the set top terminal can simply re-tune to the frequency and program number of the original SDV program they were receiving before the EAS event without generating a channel change message.

The invention claimed is:

1. At least one non-transitory computer-readable medium encoded with instructions which, when executed by a processor, performs a method comprising:
   receiving a channel change message over an access network from a subscriber terminal in a first service group indicating that the subscriber terminal is tuning from an SDV channel to a channel on which an EAS message will be received;
   in response to receipt of the channel change message, suspending reclamation of network resources allocated to the first service group and preventing a change, between a time when the message is received and an end of the EAS event associated with the EAS message, to a frequency and a program number associated with each SDV program delivered by the edge device to the first service group prior to occurrence of the EAS event associated with the EAS message; and
   in response to receipt of a second channel change message over the access network from the subscriber terminal indicating the subscriber terminal is re-tuning to the SDV channel after an end of the EAS event, the second channel change message received at a randomly selected time within a backoff time period, transmitting to the subscriber terminal a frequency and a program number associated with the SDV program delivered by the edge device to the subscriber terminal.

2. The at least one non-transitory computer-readable medium of claim 1 broadcasting to the subscriber terminals in the first service group a message that includes tuning information for each of the SDV programs being delivered over the access network, wherein the tuning information is information applicable at a time when the frequency and the program number associated with each of the SDV programs are prevented from changing.

3. The at least one non-transitory computer-readable medium of claim 2 wherein the broadcast message is delivered over an in-band channel using a mini-carousel protocol.

4. The at least one non-transitory computer-readable medium of claim 2 wherein the broadcast message includes a TTL for the SDV programs, wherein the TTL is greater than a duration of an EAS event associated with the EAS message.

5. The at least one non-transitory computer-readable medium of claim 4 further comprising receiving, prior to expiration of the TTL, a second channel change message indicating that one of the subscriber terminals in the first service group is re-tuning back to the SDV channel that is was receiving prior to receipt of the EAS message.

6. The at least one non-transitory computer-readable medium of claim 5 further comprising resuming reclamation of network resources allocated to the first service group when the second channel change message is received.

7. The at least one non-transitory computer-readable medium of claim 2 wherein the broadcast message includes a flag indicating that notification of an occurrence of an EAS event has been received.

8. The at least one non-transitory computer-readable medium of claim 7 wherein the flag directs remaining ones of the subscriber terminals in the first service group to refrain from sending a channel change message indicating that they are tuning to the channel on which the EAS message will be received.

9. The at least one non-transitory computer-readable medium of claim 7 further comprising clearing the flag after receiving a channel change message from one of the subscriber terminals in the first group indicating that they are tuning from the channel on which the EAS message was received back to the SDV channel.

10. At least one non-transitory computer-readable medium encoded with instructions which, when executed by a processor, performs a method comprising:
   during receipt of an SDV program over a first downstream SDV channel on an access network, receiving a message over the access network requesting a subscriber terminal in a first service group to tune to a channel on which an EAS message will be received;
   receiving a second message over the access network indicating that an upstream network node has not been notified that an EAS event is occurring;
   transmitting a channel change message at a first time selected from within a first predefined backoff period over an upstream path in the access network indicating that the subscriber terminal is tuning from the first downstream SDV channel to the channel on which the EAS message will be received; and
   re-tuning to the first downstream SDV channel to continue receiving the SDV program after an end of an EAS event associated with the EAS message by transmitting a second channel change message indicating the re-tune to the first downstream SDV channel at a randomly selected time within a second backoff time period.

11. The at least one non-transitory computer-readable medium of claim 10 further comprising receiving a broadcast message over the access network which includes an indication that an upstream network node has been notified that an EAS event is occurring.

12. The at least one non-transitory computer-readable medium of claim 10 wherein re-tuning to the first downstream SDV channel is performed without transmission of a second channel change message indicating that the re-tuning is being performed.

13. The at least one non-transitory computer-readable medium of claim 10 wherein tuning information required to re-tune to the first downstream SDV is available from a local memory.

14. The at least one non-transitory computer-readable medium of claim 10 further comprising receiving a broadcast message over the access network which includes an indication that an upstream network node has been notified that an EAS event is occurring and wherein tuning information required to re-tune to the first downstream SDV is obtained from the broadcast message.

15. The at least one non-transitory computer-readable medium of claim 10 wherein the channel change message is transmitted at a randomly selected time within a backoff time period.

16. A switched digital video (SDV) system, comprising:
   an SDV manager for coordinating SDV sessions requested by subscriber terminals associated with at least one service group;
   an input for receiving content to be delivered during the SDV sessions;
   at least one edge device for receiving transport streams that include an SDV program provided by the input and for transmitting each transport stream over an access network to at least one of the subscriber terminals on one of a plurality of SDV channels;
   wherein, in response to receipt of a message from a subscriber terminal in a first service group indicating that an EAS event, where each subscriber terminal in the first service group tunes to a specific frequency and program number, is occurring, the SDV manager is configured to suspend reclamation of network resources allocated to the first service group that otherwise occurs when subscriber terminals tune off an SDV channel and to prevent a change, between a time when the message is received and an end of the EAS event associated with the EAS message, to a frequency and a program number associated with each SDV program delivered by the edge device to the first service group prior to occurrence of the EAS event associated with the EAS message; and
   in response to receipt of a second channel change message over the access network from the subscriber terminal indicating the subscriber terminal is re-tuning to the SDV channel after an end of the EAS event, the second channel change message received at a randomly selected time within a backoff time period, transmitting to the subscriber terminal a frequency and a program number associated with the SDV program delivered by the edge device to the subscriber terminal.

17. A method of managing network resources when an EAS event occurs while a subscriber terminal is receiving a program on an SDV channel, comprising:
   receiving a channel change message over an access network from a subscriber terminal in a first service group indicating that the subscriber terminal is tuning from an SDV channel to a channel on which an EAS message will be received;
   in response to receipt of the channel change message, suspending reclamation of network resources allocated to the first service group and preventing a change, between a time when the channel change message is received and an end of the EAS event associated with the EAS message, to a frequency and a program number associated with each SDV program delivered to the first service group prior to occurrence of the EAS event associated with the EAS message; and receiving a second channel change message over the access network from the subscriber terminal indicating the subscriber terminal is re-tuning to the SDV channel after an end of the EAS event, the second channel change message received at a randomly selected time within a backoff time period transmitting to the subscriber terminal a frequency and a program number associated with the SDV program delivered by the edge device to the subscriber terminal.

18. The method of claim 17 broadcasting to the subscriber terminals in the first service group a message that includes tuning information for each of the SDV programs being delivered over the access network, wherein the tuning information is information applicable at a time when the frequency and the program number associated with each of the SDV programs are prevented from changing.

19. The method of claim 18 wherein the broadcast message includes a TTL for the SDV programs, wherein the TTL is greater than a duration of an EAS event associated with the EAS message.

20. The method of claim 19 further comprising receiving, prior to expiration of the TTL, a second channel change message indicating that one of the subscriber terminals in the first service group is re-tuning back to the SDV channel that is was receiving prior to receipt of the EAS message.

21. A method of communicating over an access network when receiving an EAS message, comprising:

during receipt of an SDV program over a first downstream SDV channel on an access network, receiving a message over the access network requesting a subscriber terminal in a first service group to tune to a channel on which an EAS message will be received;

receiving a second message over the access network indicating that an upstream network node has not been notified that an EAS event is occurring;

transmitting a channel change message at a first time selected from within a first predefined backoff period over an upstream path in the access network indicating that the subscriber terminal is tuning from the first downstream SDV channel to the channel on which the EAS message will be received; and re-tuning to the first downstream SDV channel to continue receiving the SDV program after an end of an EAS event associated with the EAS message by transmitting a second channel change message indicating the re-tune to the first downstream SDV channel at a randomly selected time within a second backoff time period.

22. The method of claim 21 further comprising receiving a broadcast message over the access network which includes an indication that an upstream network node has been notified that an EAS event is occurring.

* * * * *